United States Patent
Moret et al.

(10) Patent No.: US 7,018,056 B2
(45) Date of Patent: Mar. 28, 2006

(54) METHOD OF PRODUCING A LIGHTING OR SIGNALLING DEVICE, AND LIGHTING OR SIGNALLING DEVICE OBTAINED BY THIS METHOD

(75) Inventors: Frédéric Moret, Bobigny Cedex (FR); Benoit Lery, Bobigny Cedex (FR); Ghislain Lefevre, Bobigny Cedex (FR)

(73) Assignee: Valeo Vision, (FR)

( * ) Notice: Subject to any disclaimer, the term of this patent is extended or adjusted under 35 U.S.C. 154(b) by 25 days.

(21) Appl. No.: 10/634,465

(22) Filed: Aug. 5, 2003

(65) Prior Publication Data
US 2004/0027696 A1 Feb. 12, 2004

(30) Foreign Application Priority Data
Aug. 8, 2002 (FR) .................................. 02 10125

(51) Int. Cl.
*G02B 5/12* (2006.01)
(52) U.S. Cl. ...................... 359/515; 359/853
(58) Field of Classification Search ................ 359/515, 359/516, 819, 822, 823, 830, 853; 362/50 N
See application file for complete search history.

(56) References Cited
U.S. PATENT DOCUMENTS
6,086,231 A * 7/2000 Kenjo et al. ................ 362/507

FOREIGN PATENT DOCUMENTS
BE 508945 2/1952
FR 2459938 1/1981

OTHER PUBLICATIONS
Communication from French Patent Office.

* cited by examiner

*Primary Examiner*—Euncha P. Cherry
(74) *Attorney, Agent, or Firm*—Morgan & Finnegan L.L.P.

(57) ABSTRACT

The present invention concerns a method of producing a lighting or signalling device comprising a light source (16), a reflector (14) reflecting the light rays emitted by the light source (16) towards a lens (18) so as to form along an optical axis (A—A) alighting or signalling beam, the lens (18) comprising a peripheral flange (24) and being held by a support (20), the support (20) comprising an annular surface (26, 26') limited at its external periphery by a cylindrical rim (28, 34). According to the present invention, the method comprises the step consisting of deforming the cylindrical rim (28, 34) in the direction of the annular surface (26, 26') in order to envelop the peripheral flange (24) of the lens (18) and hold it in place without play and without requiring an additional component, this deformation of the cylindrical rim (28, 34) being performed by applying on this rim a force parallel to the optical axis (A—A) of the lighting or signalling device.

14 Claims, 2 Drawing Sheets

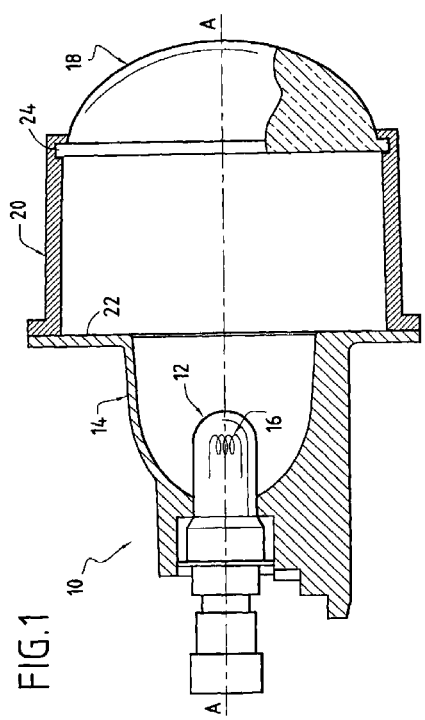
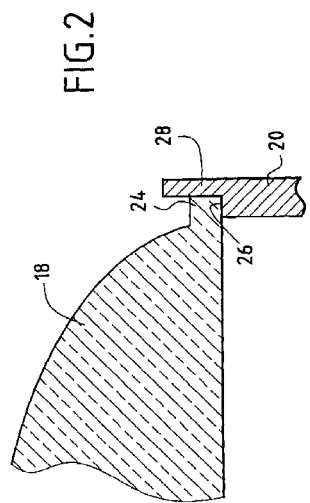
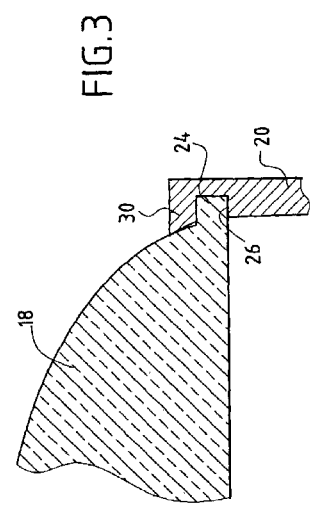

METHOD OF PRODUCING A LIGHTING OR SIGNALLING DEVICE, AND LIGHTING OR SIGNALLING DEVICE OBTAINED BY THIS METHOD

BACKGROUND OF THE INVENTION

The present invention concerns a method of producing a lighting or signalling device, in particular for a motor vehicle, and more particularly a method of fixing the lens of such a lighting or signalling device.

There is known, for example from the document FR-A-2 696 528, a headlamp comprising an elliptical reflector, a light source at the first focus of the reflector, an intermediate component made from sheet metal comprising a part in the form of a holder with at the front a lip extending gradually towards the inside, a lens comprising a collar projecting towards the outside resting on the lip of the intermediate component, and a retaining ring mounted on the back lip of the lens under prestressing and on limit stops of the intermediate component in order to press the lens onto the front lip of the intermediate component.

In this headlamp, the lip of the intermediate component gets narrower towards the back towards its free end, is mounted with its internal edge receiving the lens on the collar thereof, is adjacent to the convex part of the lens, and the limit stops for the retaining ring are formed in tongues freely cut out in the lateral wall of the intermediate component, are oriented with their free end towards the reflector, are folded radially towards the inside, and extend at an acute angle towards the flat face of the lens.

Such a design has various drawbacks. First of all, it requires an additional component, the retaining ring, being interposed between the lens and the intermediate component, the retaining ring being put in place before the tongues are folded. This additional component has a non-negligible effect on the cost of the headlamp, as well as on the manufacturing time for this headlamp. Furthermore, if this retaining ring is omitted, the lens is not held in its optimum position with respect to the light source, and the headlamp must be rejected. Finally, during folding of the tongues, the lens is frequently broken, which leads to another source of rejects.

There is also known from the document U.S. Pat. No. 6,086,231 an elliptical headlamp in which the lens is held on the intermediate element by deformation of the circumferential part, radially towards the inside, in order to grip the lip of the lens.

The documents FR-A-2 459 938 and BE-A-508 945 describe parabolic headlamps comprising a reflector and a glass, the glass being held by folding over by thermoforming the lateral wall of a strut or by hot crimping the rim of the reflector against the back lip of the glass.

The application of radial forces, that is to say forces perpendicular to the optical axis of the headlamp, is difficult to control, so that it frequently happens that the lens or the glass breaks or cracks, the reject rate then being relatively high.

SUMMARY OF THE INVENTION

The present invention is situated in this context and its aim is to propose a method of manufacturing a lighting or signalling device which does not require an additional component between the lens and its support, which can easily be automated so as to reduce the cost of the lighting or signalling device, which is reliable so as to limit rejects, and which is inexpensive.

The object of the present invention is therefore a method of producing a lighting or signalling device comprising a light source, a reflector reflecting the light rays emitted by the light source towards a lens so as to form along an optical axis a lighting or signalling beam, the lens comprising a peripheral flange and being held by a support, the support comprising an annular surface limited at its external periphery by a cylindrical rim.

According to the present invention, this method comprises the step consisting of deforming the cylindrical rim in the direction of the annular surface in order to envelop the peripheral flange of the lens and hold it in place without play and without requiring an additional component, this deformation of the cylindrical rim being performed by applying on this rim a force parallel to the optical axis of the lighting or signalling device.

According to other advantageous and non-limiting characteristics of the invention:
- the support is made from a viscoelastic material;
- the deformation of the cylindrical rim is the result of a plastic flow phenomenon;
- the deformation of the cylindrical rim is performed at least three points on this rim;
- the deformation of the cylindrical rim is performed over the whole of this rim;
- the support consists of an injected and/or moulded material, and the force on the cylindrical rim is between 100 dN and 3000 dN;
- the deformation of the cylindrical rim is performed by crimping this rim.

Another object of the present invention is a lighting or signalling device comprising a light source, a reflector reflecting the light rays emitted by the light source towards a lens so as to from along an optical axis a lighting or signalling beam, the lens comprising a peripheral flange and being held by a support, the support comprising an annular surface limited at its external periphery by a cylindrical rim, in which the lens is held on the support by a method in accordance with one of the above characteristics.

Other aims, characteristics and advantages of the present invention will emerge clearly from the description which now follows of an example embodiment given on a non-limiting basis with reference to the accompanying drawings in which:

DESCRIPTION OF THE DRAWINGS

FIG. 1 depicts a schematic sectional view of an elliptical headlamp produced in accordance with the teachings of the invention;

FIG. 2 depicts an enlarged view of a detail of FIG. 1, in a first step of the method according to the present invention;

FIG. 3 depicts an enlarged view of the same detail of FIG. 1, in a second step of the method according to the present invention;

DETAILED DESCRIPTION

Figure 4:
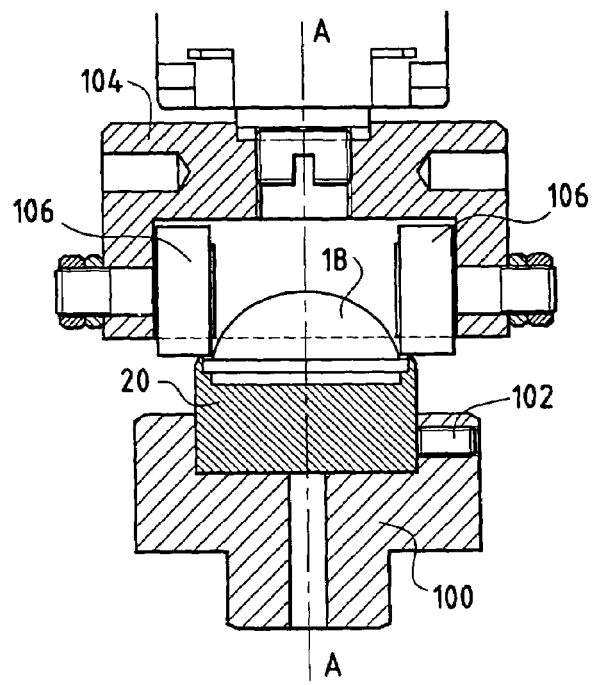
FIG. 4 depicts a view of a machine enabling implementation of the method according to the present invention.

By way of a preliminary, it should be noted that, from one figure to another, identical or similar elements are referenced as far as possible by the same reference signs.

FIG. 1 depicts a headlamp 10, in particular for a motor vehicle, which comprises a bulb 12 mounted in the far end of a reflector 14 of the elliptical type so that the light source 16 provided by the bulb 12 is situated in the vicinity of a first focus of the reflector 14. Such a light source 16 can be constituted by the filament of an incandescent bulb, or by the electric arc of a gaseous discharge lamp.

The remainder of the description will use non-limitatively an orientation from back to front, along the optical axis A—A of the headlamp 10, which corresponds to the direction of propagation of the light beam emitted by the device. Thus, in FIG. 1, the "front" is situated at the right of the figure, whilst the "back" is situated at the left.

The optical axis A—A is generally parallel to the longitudinal axis of the vehicle equipped with the headlamp 10. The optical axis A—A is substantially horizontal and can be defined for example by the two foci of the reflector 14.

The headlamp 10 comprises a convergent lens 18 which is mounted, at the front, on a support which is formed in a framework part 20 of the headlamp 10 fixed on a front transverse surface 22 of the reflector 14. The focal plane of the lens 18 passes in the vicinity of the second focus of the reflector 14. In a variant, the framework part 20 can be produced in a single piece with the reflector 14.

The assembly of the elements described above constitutes an optical headlamp unit 10 which is for example mounted conventionally in a housing (not depicted) closed by a glass.

In a known manner, the lens 18 is flat-convex, and comprises at its periphery a substantially cylindrical flange 24. In a headlamp of the elliptical kind, the flat surface of the lens 18 is turned towards the back, whilst the convex surface is turned towards the front. The peripheral flange 24 prolongs the back flat surface, so that the radius of the back flat surface is smaller than the radius of curvature of the convex front surface of this lens.

As can be seen in FIG. 1, the lens 18, or more exactly its peripheral flange 24, is enveloped by the support 20, so that the position of the lens along the optical axis A—A is defined accurately.

To do this, as can be seen better in FIGS. 2 and 3, the support 20 comprises an annular surface 26 limited at its external periphery by a cylindrical rim 28 extending towards the front.

The annular surface 26 is such that its internal diameter is smaller than that of the back flat surface of the lens 18, whilst the internal diameter of the cylindrical rim 28 is slightly greater than that of this back flat surface of the lens 18.

It is then possible to dispose the lens 18 from the front on the support 20, so that its peripheral flange 24 rests on the annular surface 26 of the support 20, as depicted in FIG. 2, and is surrounded by the peripheral rim 28.

In accordance with the present invention, in this position, provision is made to deform the peripheral rim 28 so that it comes to envelop the flange 24 of the lens 18. To do this, provision is made to apply a force on the front end of the rim 28, in a direction substantially parallel to the optical axis A—A, so that it comes to envelop the flange 24 and hold it firmly in place. The material constituting the support 20 is chosen from the group of viscoelastic materials so that the application of a force or stress on this material causes a plastic flow phenomenon, this term being understood in the present description as meaning a cold flow of the material under the effect of a temporary stress.

According to this first embodiment of the method of the present invention, this force can be applied on the whole of the front end of the rim 28, so that the flange 24 of the lens 18 is totally enveloped by this rim thus deformed. This variant is similar to crimping of the support 20 around the lens 18.

According to a variant of this first embodiment, this force can be applied on the rim 28 locally, so that the lens 18 is held only at predetermined points of the flange 24. Preferably, the points of application of this force will be situated symmetrically with respect to the optical axis A—A. There will for example be three of them, spaced apart by 120° with respect to the centre of the back flat face of the lens 18.

There can for example be used for this purpose a crimping or *nap riveting machine, such as the one depicted schematically in FIG. 4. Such a machine comprises for example a base 100 on which the support 20 is immobilized, for example by means of jaws 102.

The lens 18 is then disposed on the support 20, so that its peripheral flange 24 rests on the annular surface 26 of the support 20 and is surrounded by the peripheral rim 28, as depicted in FIG. 2. Next, a clamp 104, provided with at least one roller 106, two having been depicted in FIG. 4, is brought closer to the lens 18 so that this or these rollers come to engage the front surface of the peripheral rim 28.

The clamp 104 is then rotated about an axis coincident with that of the lens 18, so roller or rollers 106 roll on the rim 28.

According to the viscoelastic material constituting the support 20 and the thickness of the rim 28, the clamp 104, and therefore the roller or rollers 106, are applied on the rim 28 with a force or pressure sufficient to deform it so that it is flattened by plastic flow and forms a shoulder or a bead 30, which comes to surround the flange 24, in order to envelop or confine it permanently.

By way of example, if the support is made from injected aluminum, and if the rim 28 has a thickness of approximately 3 mm, a force of approximately 800 dN can be applied on the rim 28 without the rim thus deformed breaking the flange 24 or the lens 18.

According to other example embodiments, if the support is made from injected magnesium, and if the rim 28 has a thickness of approximately 4 mm, a force of approximately 600 dN can be applied on the rim 28 to deform it, and if the support is made from an injected thermoplastic material, for example PBT (polybutylene terephthalate) with 30% glass fibres, and if the rim 28 has a thickness of approximately 5 mm, a force of approximately 300 dN can be applied on the rim 28 to deform it.

A fixing of the lens 18 is then obtained such as depicted in FIG. 3, where it can be seen that the front end of the support 20 confines or envelops without play the lens 18, without it being necessary to use an additional component such as a retaining ring or a spring, as in the prior art.

Surprisingly, the Applicant noted that the method which has just been described is remarkably reliable, and that the reject rate is notably lower than with the methods of the prior art.

FIGS. 2 to 4 depict an embodiment in which the lens 18 is held by a deformation of its support from the front. It is of course possible to envisage that the lens 18 is held by a deformation of its support from the back. This is what is depicted in FIGS. 5 and 6.

It can be seen in these Figures that the support 20 comprises, as in the embodiment which has just been described, an annular surface 26', but which this time faces the back of the support 20. The annular surface 26' is formed at the back of a radial rim or shoulder 32 of the internal surface of the support 20, defining an internal cylindrical surface 34.

Figure 5:
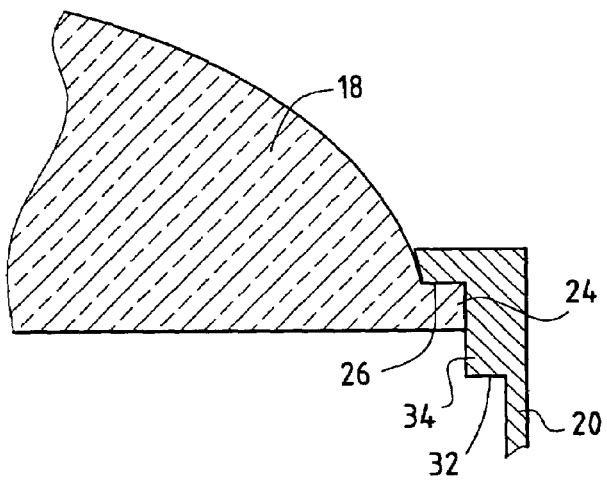
FIG. 5 depicts a detail of a first step of a second embodiment of the method according to the present invention.
Figure 6:
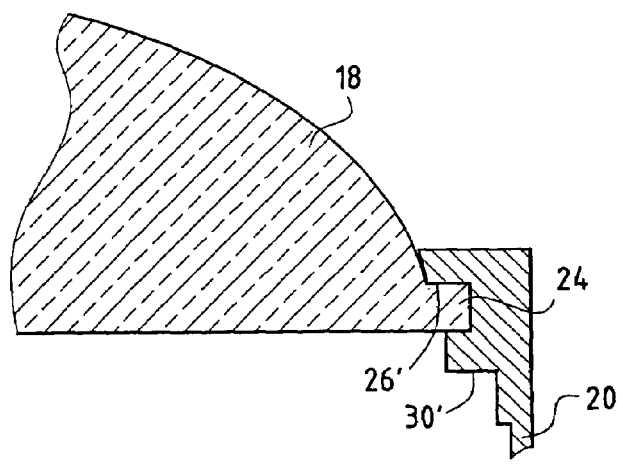
FIG. 6 depicts a detail of the second step of the second embodiment of the method according to the present invention.

The lens 18 is then disposed on the annular surface 26' of the support 20, so that its peripheral flange 24 rests on the annular surface 26' of the support 20 and is surrounded by the Internal cylindrical surface 34, as depicted in FIG. 5. As in the preceding embodiment, pressure is applied on the rim or the shoulder 32 in order to deform it so that it is flattened and comes to form a bead 30' which surrounds or envelops without play the flange 24 of the lens 18.

As in the preceding embodiment, according to a variant, this force can be applied on the shoulder 32 locally, so that the lens 18 is held only at predetermined points of the flange 24. Preferably, the points of application of this force will be situated symmetrically with respect to the optical axis A—A. There will for example be three of them, spaced apart by 120° with respect to the centre of the back flat face of the lens 18.

According to another variant of this second embodiment of the method of the invention, the force necessary for deformation of the shoulder 32 can be applied on the whole of the back face of this rim shoulder, so that the flange 24 of the lens 18 is totally enveloped by this rim thus deformed. Use will be made for this purpose of the same type of crimping or snap riveting machine as the one described in connection with FIG. 4, in order to obtain a fixing of the lens as depicted in FIG. 6.

There has therefore clearly been implemented according to the present invention a method of manufacturing a lighting or signalling device which does not require an additional component between the lens and its support, which can easily be automated so as to reduce the cost of the lighting or signalling device, which is particularly reliable as regards rejects, and which is inexpensive.

Of course, the present invention is not limited to the embodiments which have been described, but persons skilled in the art can on the contrary make many modifications thereto which fall within its scope. Thus the lens support can be added onto the reflector, or be in a single piece therewith. Likewise, although having been described in connection with the manufacture of an elliptical type headlamp, the present invention is applicable to the fixing of a glass of a lighting or signalling device onto the housing of this device.

The invention claimed is:

1. A method of producing a lighting or signalling device comprising a light source, a reflector reflecting the light rays emitted by the light source towards a lens so as to form along an optical axis a lighting or signalling beam, the lens comprising a peripheral flange and being held by a support, the support comprising an annular surface limited at its external periphery by a cylindrical rim, the method comprising the step deforming the cylindrical rim in the direction of the annular surface in order to envelop the peripheral flange of the lens and hold it in place without play and without requiring an additional component, this deformation of the cylindrical rim being performed by applying on this rim a force parallel to the optical axis of the lighting or signalling device.

2. A method according to claim 1, wherein the support is made from a viscoelastic material.

3. A method according to claim 2, that wherein the deformation of the cylindrical rim is the result of a plastic flow phenomenon.

4. A method according to claim 1, wherein the deformation of the cylindrical rim is performed at at least three points on this rim.

5. A method according to claim 1, wherein the deformation of the cylindrical rim is performed over the whole of this rim.

6. A method according to claim 1, wherein the support comprises injected and/or moulded material, and wherein the force applied on the cylindrical rim is between 100 dN and 3000 dN.

7. A method according to claim 5, wherein the deformation of the cylindrical rim is performed by crimping this rim.

8. A lighting or signalling device comprising a light source, a reflector reflecting the light rays emitted by the light source towards a lens so as to form along an optical axis a lighting or signalling beam, the lens comprising a peripheral flange and being held by a support, the support comprising an annular surface limited at its external periphery by a cylindrical rim, wherein the lens is held on the support by a method in accordance with claim 1.

9. A lighting or signalling device comprising a light source, a reflector reflecting the light rays emitted by the light source towards a lens so as to form along an optical axis a lighting or signalling beam, the lens comprising a peripheral flange and being held by a support, the support comprising an annular surface limited at its external periphery by a cylindrical rim, wherein the lens is held on the support by a method in accordance with claim 2.

10. A lighting or signalling device comprising a light source, a reflector reflecting the light rays emitted by the light source towards a lens so as to form along an optical axis a lighting or signalling beam, the lens comprising a peripheral flange and being held by a support, the support comprising an annular surface limited at its external periphery by a cylindrical rim, wherein the lens is held on the support by a method in accordance with claim 3.

11. A lighting or signalling device comprising a light source, a reflector reflecting the light rays emitted by the light source towards a lens so as to form along an optical axis a lighting or signalling beam, the lens comprising a peripheral flange and being held by a support, the support comprising an annular surface limited at its external periphery by a cylindrical rim, wherein the lens is held on the support by a method in accordance with claim 4.

12. A lighting or signalling device comprising a light source, a reflector reflecting the light rays emitted by the light source towards a lens so as to form along an optical axis a lighting or signalling beam, the lens comprising a peripheral flange and being held by a support, the support comprising an annular surface limited at its external periphery by a cylindrical rim, wherein the lens is held on the support by a method in accordance with claim 5.

13. A lighting or signalling device comprising a light source, a reflector reflecting the light rays emitted by the light source towards a lens so as to form along an optical axis a lighting or signalling beam, the lens comprising a peripheral flange and being held by a support, the support comprising an annular surface limited at its external periphery by a cylindrical rim, wherein the lens is held on the support by a method in accordance with claim 6.

14. A lighting or signalling device comprising a light source, a reflector reflecting the light rays emitted by the light source towards a lens so as to form along an optical axis a lighting or signalling beam, the lens comprising a peripheral flange and being held by a support, the support comprising an annular surface limited at its external periphery by a cylindrical rim, wherein the lens is held on the support by a method in accordance with claim 7.

* * * * *

UNITED STATES PATENT AND TRADEMARK OFFICE
CERTIFICATE OF CORRECTION

| | |
|---|---|
| PATENT NO. | : 7,018,056 B2 |
| APPLICATION NO. | : 10/634465 |
| DATED | : March 28, 2006 |
| INVENTOR(S) | : Moret et al. |

Page 1 of 1

It is certified that error appears in the above-identified patent and that said Letters Patent is hereby corrected as shown below:

Claim 3, Column 5, line 65, delete the word "that".

Signed and Sealed this

Twenty-second Day of August, 2006

JON W. DUDAS
*Director of the United States Patent and Trademark Office*